(12) United States Patent
Merrill

(10) Patent No.: US 8,918,974 B2
(45) Date of Patent: Dec. 30, 2014

(54) METHOD AND APPARATUS FOR ADJUSTING AXLE ALIGNMENT

(75) Inventor: Zachary A. Merrill, Greenville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 729 days.

(21) Appl. No.: 13/133,703

(22) PCT Filed: Dec. 15, 2008

(86) PCT No.: PCT/US2008/086768
§ 371 (c)(1),
(2), (4) Date: Jun. 9, 2011

(87) PCT Pub. No.: WO2010/071627
PCT Pub. Date: Jun. 24, 2010

(65) Prior Publication Data
US 2011/0239430 A1    Oct. 6, 2011

(51) Int. Cl.
| | | |
|---|---|---|
| *B23P 6/00* | (2006.01) |
| *B23P 23/00* | (2006.01) |
| *B23P 11/00* | (2006.01) |
| *B23P 19/00* | (2006.01) |
| *B60G 7/02* | (2006.01) |
| *B60G 1/00* | (2006.01) |
| *B60B 35/00* | (2006.01) |
| *B60B 37/00* | (2006.01) |
| *B60B 35/04* | (2006.01) |
| *B62D 17/00* | (2006.01) |

(52) U.S. Cl.
CPC ............... *B60B 35/04* (2013.01); *B62D 17/00* (2013.01)
USPC ................. 29/402.03; 29/402.02; 29/525.02; 29/252.03; 29/650; 301/124.1; 280/86.75

(58) Field of Classification Search
CPC ............. B60B 35/025; B60G 2200/46; B60G 2200/462; B60G 2200/4622; B62D 33/044; B62D 17/00; B25B 27/14
USPC .................... 29/402.03, 402.02, 650, 525.01, 29/525.02, 525.03; 280/86.75, 86.751, 280/86.753, 86.754, 86.755, 86.758; 301/124.1, 131, 132
See application file for complete search history.

(56) References Cited

U.S. PATENT DOCUMENTS 774,042 A * 11/1904 Cooper .................... 301/132
2,832,615 A * 4/1958 Summers ................. 285/342
(Continued)

OTHER PUBLICATIONS

PCT International Search Report for PCT/US2008/086768, dated Mar. 10, 2009.

*Primary Examiner* — Jermie Cozart
*Assistant Examiner* — Bayan Salone
(74) *Attorney, Agent, or Firm* — Dority Manning, P.A.

(57) ABSTRACT

Methods and apparatus are provided for adjusting the alignment of an axle so that adjustments to toe, camber, and/or thrust can be more readily achieved. In one embodiment, a pair of non-parallel shims is located between flange elements. Positioning elements are located along the flange elements at a position outside the peripheral edge of the shims. Upon application of a torque to the positioning elements, the flange elements can be pushed apart or pulled together so as to provide for access to the shims.

18 Claims, 5 Drawing Sheets

(56) References Cited

U.S. PATENT DOCUMENTS

| | | | | |
|---|---|---|---|---|
| 3,342,507 A | * | 9/1967 | Koch et al. | 280/86.754 |
| 3,401,981 A | * | 9/1968 | Adams | 301/132 |
| 3,520,377 A | * | 7/1970 | Wallace | 180/7.1 |
| 4,037,680 A | * | 7/1977 | Grove | 180/254 |
| 4,058,328 A | * | 11/1977 | Nickerson et al. | 285/45 |
| 4,127,306 A | * | 11/1978 | Foster | 301/127 |
| 4,195,862 A | * | 4/1980 | Specktor et al. | 280/86.753 |
| 4,336,959 A | * | 6/1982 | Roche | 285/368 |
| 4,506,919 A | * | 3/1985 | Peting | 285/231 |
| 4,684,150 A | * | 8/1987 | Specktor et al. | 280/86.753 |
| 4,795,187 A | * | 1/1989 | Ingalls | 280/86.753 |
| 4,867,472 A | * | 9/1989 | Ward | 280/86.753 |
| 4,872,699 A | | 10/1989 | Grove et al. | |
| 4,890,889 A | * | 1/1990 | Burgett | 301/132 |
| 5,098,117 A | * | 3/1992 | Specktor et al. | 280/86.753 |
| 5,116,085 A | * | 5/1992 | Carrel | 285/225 |
| 5,205,356 A | * | 4/1993 | Bridges et al. | 166/85.1 |
| 5,259,689 A | * | 11/1993 | Arand et al. | 403/337 |
| 5,564,177 A | * | 10/1996 | Fernandes et al. | 29/451 |
| RE36,058 E | * | 1/1999 | Sokol | 280/86.753 |
| 5,918,707 A | * | 7/1999 | Saunders, III | 188/18 A |
| 6,036,205 A | * | 3/2000 | Schlosser et al. | 280/86.753 |
| 6,065,784 A | * | 5/2000 | Lundstrom | 285/368 |
| 6,299,259 B1 | * | 10/2001 | MacKarvich | 301/127 |
| 6,431,659 B1 | * | 8/2002 | Somppi | 301/132 |
| 6,631,928 B1 | * | 10/2003 | Sakata | 285/226 |
| 6,790,145 B2 | * | 9/2004 | Niebling et al. | 464/178 |
| 6,945,570 B2 | * | 9/2005 | Jones | 285/421 |
| 6,959,789 B2 | * | 11/2005 | Torii et al. | 188/18 A |
| 7,604,416 B2 | * | 10/2009 | Niebling et al. | 384/544 |
| 8,333,015 B2 | * | 12/2012 | Merrill | 29/897.2 |
| 2001/0015536 A1 | * | 8/2001 | McIntyre | 280/86.751 |
| 2007/0086690 A1 | * | 4/2007 | Niebling et al. | 384/544 |
| 2011/0181011 A1 | * | 7/2011 | Merrill | 280/86.751 |

* cited by examiner

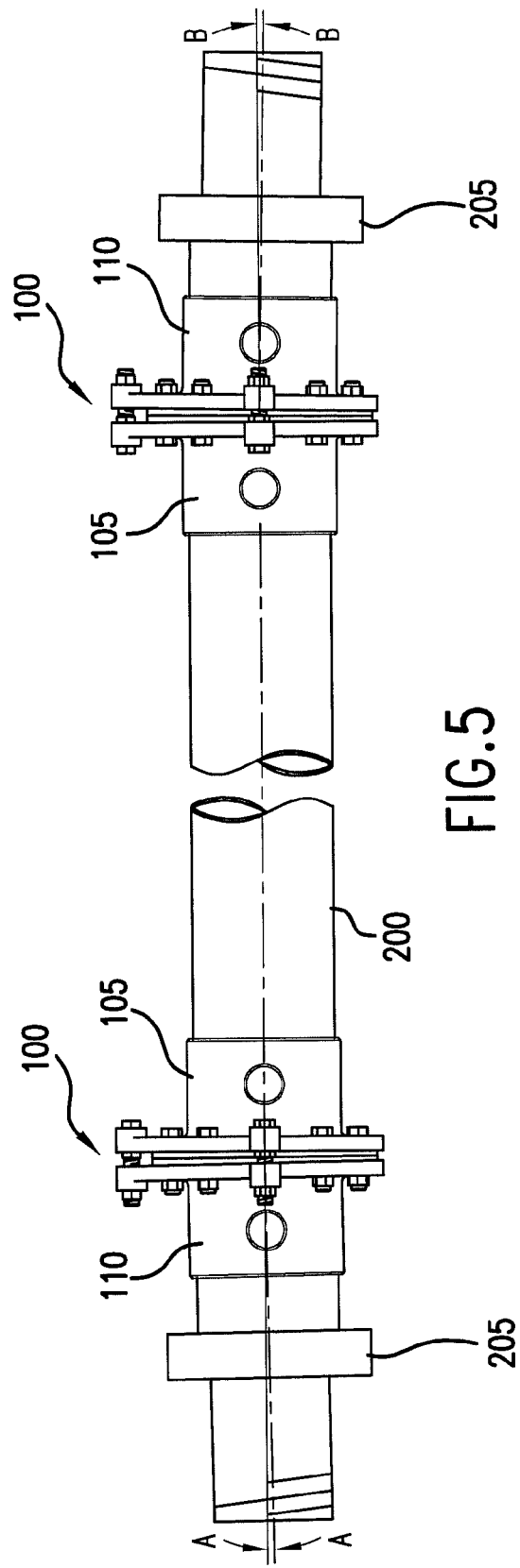

METHOD AND APPARATUS FOR ADJUSTING AXLE ALIGNMENT

TECHNICAL FIELD OF THE INVENTION

The present invention relates to methods and apparatus for adjusting the alignment of an axle so that adjustments to toe, camber, and/or thrust can be achieved without disassembling and separating the axle into portions.

BACKGROUND OF THE INVENTION

The alignment of a vehicle's wheel plane relative to the path traveled by the vehicle affects not only the handling of the vehicle but also affects the wear on the tires. As used here, alignment refers to camber, toe, and thrust. Camber is the angle between the vertical axis of the wheel and the vertical axis of the vehicle. Positive camber refers to an angle where the top of the wheel is farther away from the center of vehicle than the bottom of the wheel. Negative camber refers to an angle where the bottom of the wheel is farther away from center of the vehicle than the top. Generally speaking, camber changes of even slightly more than a fourth of one degree can impact tire wear. Toe is the angle each wheel makes with the longitudinal axis of the vehicle. Positive toe, also referred to as toe in, is a condition where the front of the wheel is pointing in or towards the center line of the vehicle. Negative toe, also referred to as toe out, is a condition where the front of the wheel points out or away from the center line of the vehicle. Thrust is the resulting direction of travel of an axle as opposed to the direction that might be expected from the orientation of the tires on the axle. Generally speaking, toe changes of even one-tenth of a degree can have an impact on tire wear.

The contribution of tire alignment to tire wear can be particularly problematic with vehicles used for transporting heavy loads. As different weights are loaded and unloaded from the vehicle (used herein to refer to both motorized vehicles as well as trailers), one or more of the vehicle's axles will likely flex. Depending upon the amount of weight and the rigidity of the axle, the axle may bow and cause the wheels to orient towards negative camber—a condition that can cause unfavorable tire wear. Once the weight is removed, the axle may recover and again affect the alignment of the wheels. Because of factors such as the additional costs and amount of material that would be required, increasing the stiffness of the axle to resolve camber issues may not be practical.

A proposed solution for addressing tire alignment problem is to incorporate a coupling into the axle and include a special shim between the coupling interface. More specifically, a tapered shim can be configured into the axle assembly to allow for the altering or correction of the relative alignment of an axle or spindle and, therefore, the alignment of the wheel and tire that are carried on the axle or spindle. Unfortunately, currently available shim assemblies generally have certain disadvantages. Typically, disassembly of the axle into various components is required such as e.g., removal of the wheel, spindle, or both before the shim can be adjusted. For trailer loads that may vary substantially, a labor intensive process to access and adjust the shim may not be practical. Additionally, axles are frequently hollow and contain fluids such as lubricants or air for pneumatic brakes. Shim systems that do not allow for a means of sealing such fluids can be unacceptable in certain applications.

Therefore, a need exists for improved methods and apparatus for adjusting or correcting axle alignment. A system that allows for adjustment while minimizing the amount of disassembly and labor required would be particularly advantageous. Additional usefulness would be provided by a system that allows for adjustment of the alignment of an axle used to contain a fluid.

SUMMARY OF EXEMPLARY EMBODIMENTS

Objects and advantages of the invention will be set forth in part in the following summary description, or may be obvious from the description, or may be learned through practice of the invention. A summary of certain exemplary embodiments and methods of the present invention will now be set forth. As used herein, torque shall be understood to mean a force that produces or tends to produce rotation.

In one exemplary aspect, the present invention allows for a method for adjusting axle alignment that includes providing an axle comprising two portions, the two portions connected by a plurality of fastening elements and a plurality of positioning elements; disengaging the plurality of fastening elements; applying a torque to one or more positioning elements so as to cause the positioning elements to push apart the two portions of the axle; selecting the position of a pair of non-parallel shims relative to the two portions of the axle so as to provide the desired axle alignment; and applying a torque to either i) one of the positioning elements, ii) one of the fastening elements, or iii) both, so as to pull together the two portions of the axle.

The selecting step can include removing the pair of non-parallel shims from between the two portions of the axle while leaving the two portions of the axle connected by the positioning elements and can also include rotating at least one of the non-parallel shims. The step of applying a torque may include applying the torque at a location that is between the two portions of the axle. Additionally, after the selecting and engaging steps are completed, the position of the pair of non-parallel shims relative to the two portions of the axle can be maintained by inserting the fastening elements through each of the non-parallel shims.

The method may also include the additional step of determining the amount of camber based on the anticipated load and use to be applied to the axle.

The non-parallel shims can be provided with index tabs for determining the position of each shim. A fluid seal between the two portions of the axle may also be created by, for example, providing a recess in one of the axle portions and inserting an o-ring into the recess.

In another exemplary aspect of the present invention, a system for adjusting the alignment of an axle is provided, with the axle having at least two portions to be aligned. The system includes a first flange and a second flange, with each flange connected with one of the axle portions. A pair of non-parallel shims is located between the first and second flange, the shims each having a peripheral edge. A plurality of fastening elements connect the first and second flanges by extending through the first and second flanges. A plurality of positioning elements are positioned outside the peripheral edges of the shims and connect the first and second flanges. The plurality of positioning elements are configured for pushing apart the two portions of the axle by application of a torque to the positioning elements.

This exemplary embodiment may include a fluid seal received by the second flange. With the axle defining a radial direction, the plurality of positioning elements can be located radially outside of the plurality of fastening elements. The first and second flanges may define a boss for receipt of at least one of the non-parallel shims. The first flange may have a plurality of threaded holes configured for receipt of the plurality of positioning elements. The second flange may have a plurality of non-threaded holes configured for receipt of the plurality of positioning elements with each of the non-threaded holes having a chamfer. Desirably, a totally of three positioning elements are used, the positioning elements being spaced about the flanges at 270, 0, and 90 degrees respectively. As such, a plurality of positioning elements are positioned about the first and second flanges so that the pair of non-parallel shims may be removed through the bottom of the first and second flanges without removing the plurality of positioning elements from the first and second flanges. The positioning elements may include a bolt inserted through the first and second flanges, a positioning nut located between the first and second flanges; and a nut located on the bolt at a position outside of the first and second flanges.

The first and second flanges may each be formed as an integral part of the axle portions. The pair of non-parallel shims may include index tabs for determining the position of the shims.

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 5 illustrates an axle having a dual installation of the exemplary embodiment of FIG. 1 on the axle.

DETAILED DESCRIPTION

Figure 1:
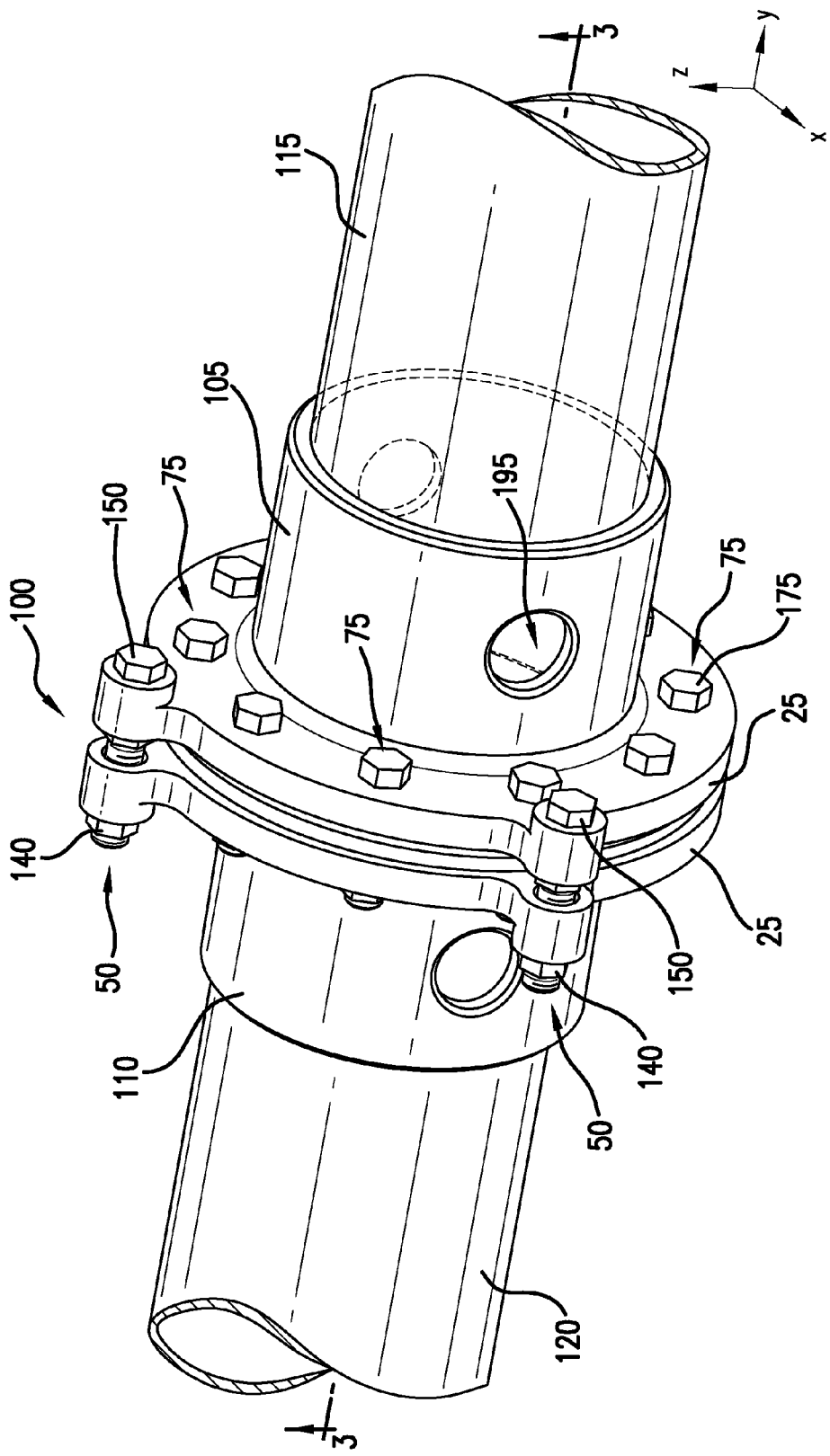
FIG. 1 is a perspective view of an exemplary embodiment of the present invention.

The present invention relates to a method and apparatus for adjusting the alignment of an axle. Exemplary embodiments of the invention can be used to make toe, camber, and/or thrust corrections and combinations thereof without the necessity of completely separating the axle into unattached portions. Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention includes these and other modifications and variations.

Figure 2:
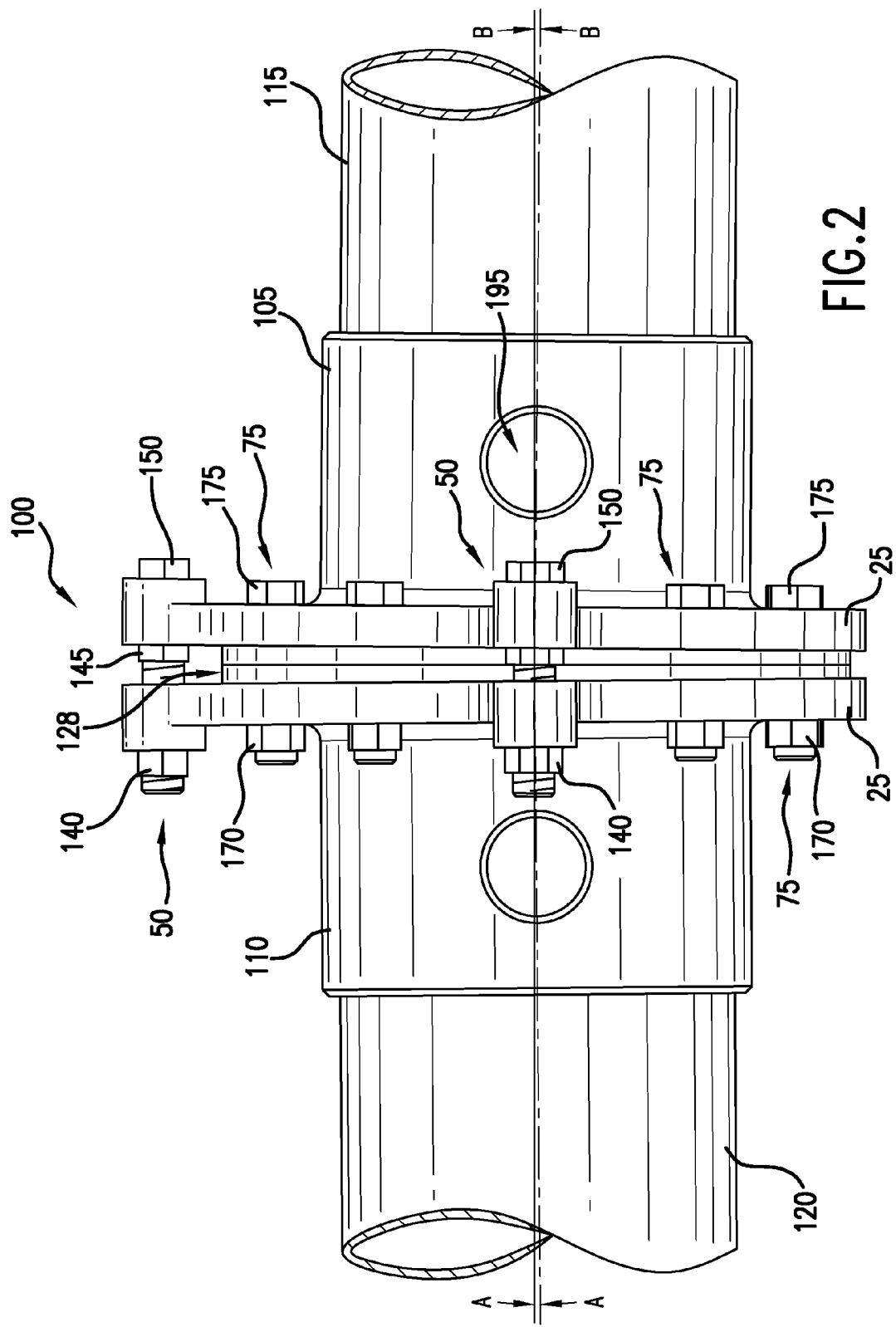
FIG. 2 is a perspective, side view of the exemplary embodiment illustrated in FIG. 1.
Figure 3:
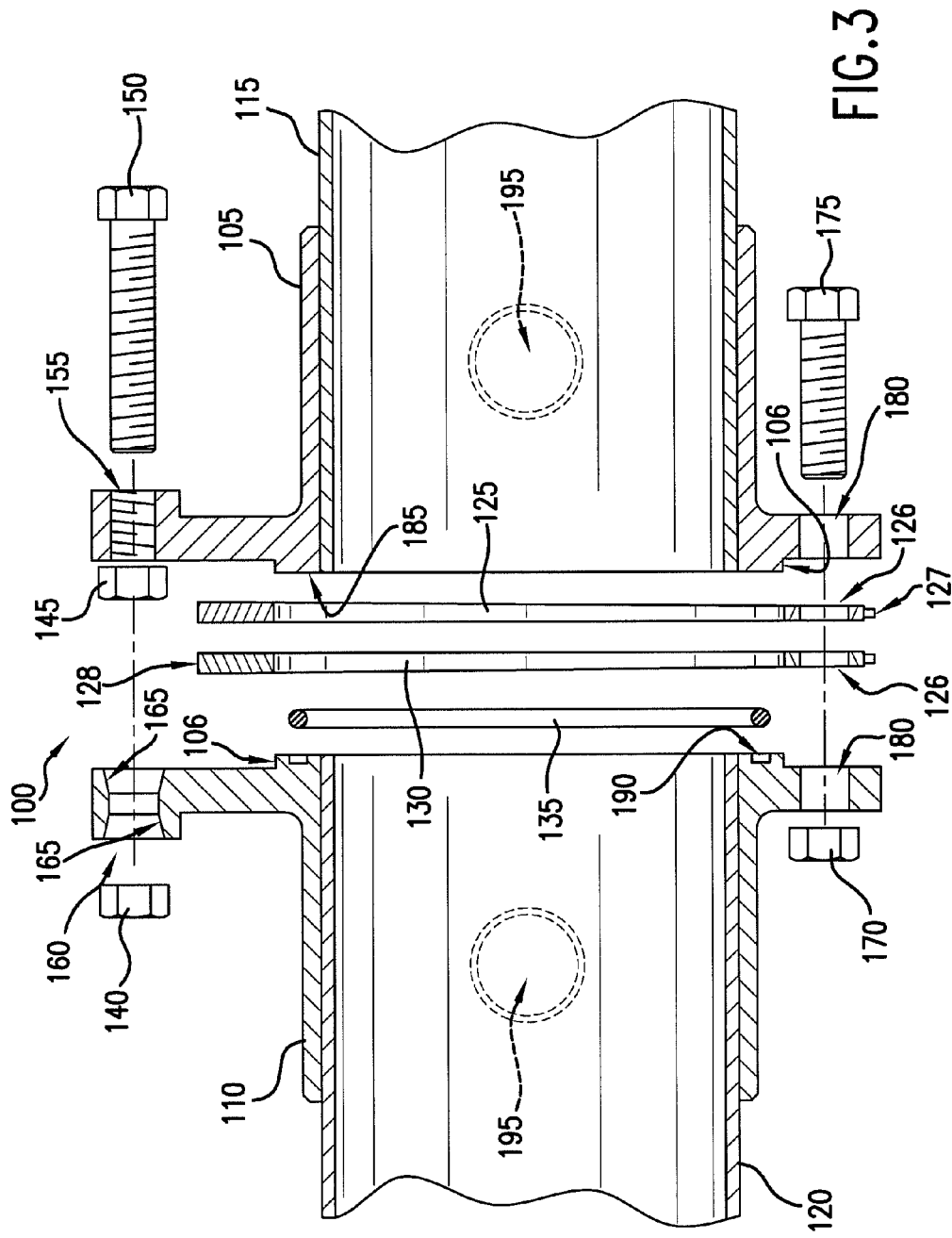
FIG. 3 is cross-section view, taken along line 3-3, of the exemplary embodiment illustrated in FIG. 1.
Figure 4:
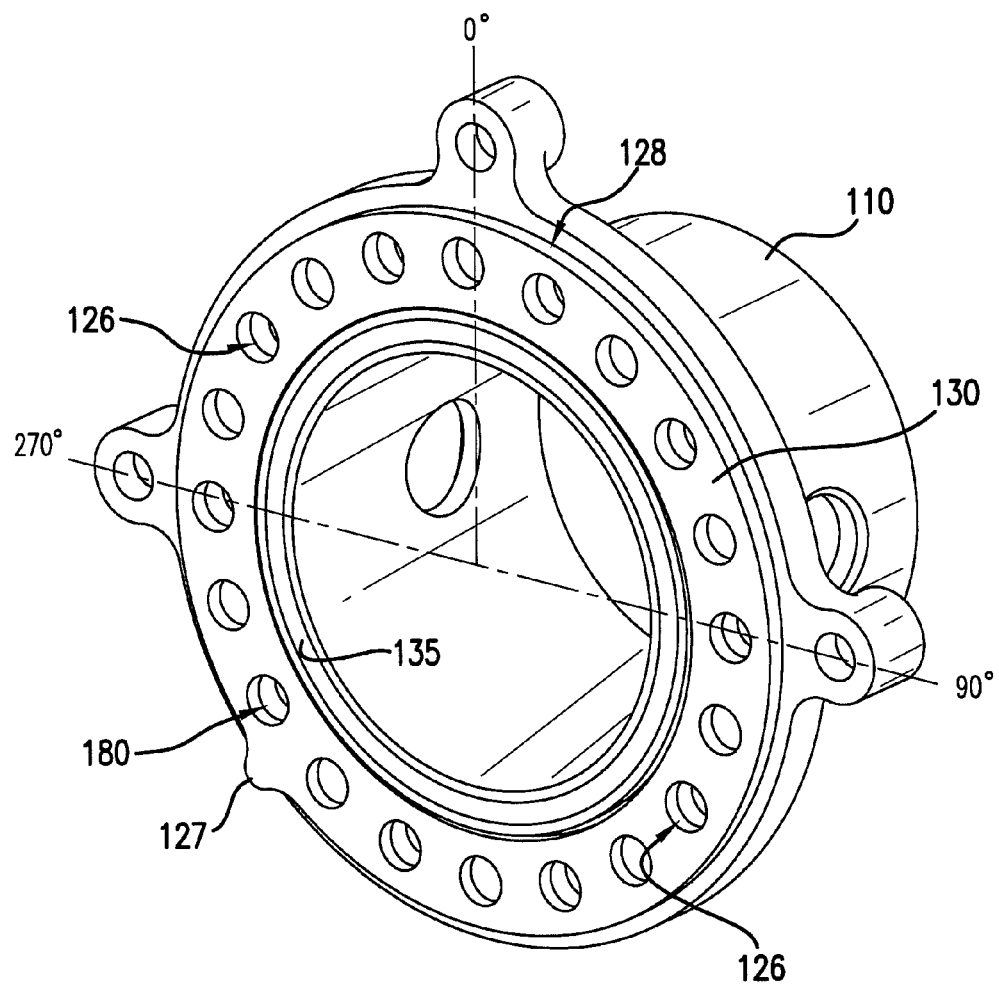
FIG. 4 is a perspective view of one side of the exemplary embodiment of FIG. 1.

FIGS. 1 through 3 illustrate an exemplary embodiment of a flange system 100 for adjusting axle alignment, and FIG. 4 illustrates a perspective view of one side of system 100. The axle is divided into two portions including first portion 115 and second portion 120. Assuming, for example, that second portion 120 is the inboard portion of the axle, the present invention provides for adjustment of the alignment of the axle by adjusting the relative positions of the first and second portions 115 and 120 as illustrated by arrows A and B in FIG. 2.

Flange system 100 includes a first flange element 105 and a second flange element 110 that are connected to the axle portions 115 and 120. Elements 105 and 110 can be attached to the axle portions 115 and 120 using e.g., plug weld holes 195 or formed as an integral part thereof. Using the teaching disclosed herein, one of skill in the art will understand that other construction and attachment methods may be used as well. Flange elements 105 and 110 connect axle portions 115 and 120 in a manner that will be more specifically described.

Each flange element 105 and 110 has a lip 25. A plurality of fastening elements 75 connect flange elements 105 and 110. The lip 25 on each flange has a plurality of non-threaded apertures 180 (FIGS. 3 and 4) spaced circumferentially about the lip 25. For this embodiment, each fastening element 75 includes nut 170 attached to a bolt 175 extending through a non-threaded aperture 180 in each lip 25. Nut 170 may be of a self-locking type or other types may be used as well. As shown in FIGS. 1 and 2, the fastening elements 75 are equally spaced about the circumference of each lip 25 and, with application of a proper torque, serve to secure the flange elements 105 and 110 together.

Each flange element 105 and 110 includes a boss 106 (FIG. 3) for aligning a pair of non-parallel shims 125 and 130 on a respective flange. The bolt 175 of each fastening element 75 passes through a non-threaded aperture 126 that is located in each shim 125 and 130 (FIGS. 3 and 4). More particularly, as shown in FIG. 4 for one side of system 100, a plurality of non-threaded apertures 126 are spaced about the circumference of shim 130, through which bolt 175 extends. Accordingly, fastening elements 75 secure the portions 115 and 120 of the axle together while also fixing the position of shims 125 and 130 between flange elements 105 and 110.

Axles are frequently manufactured from hollow tubing, as illustrated with axle portions 115 and 120 in FIGS. 1 through 3, to allow for the containment of fluids such as oil, grease, or air. In such case, second flange element 110 is provided with a recess or groove 190 for the receipt of a seal such as o-ring 135 as shown in FIGS. 3 and 4. Upon compression between flange elements 105 and 110, o-ring 135 contacts surface 185 of flange element 105 to provide a fluid seal.

As best illustrated in FIG. 3 and FIG. 4, the pair of shims 125 and 130 have non-parallel sides. More specifically, each shim 125 and 130 has a slight taper. For the exemplary embodiment illustrated, a taper of approximately 0.5 degrees is depicted. However, other amounts of taper may be used to control the rate of adjustment or correction to the axle alignment that is achieved. As will be understood by one of skill in the art using the teachings disclosed herein, the alignment of axle portions 115 and 120 can be readily adjusted by modifying the position of shims 125 and 130. More specifically, shims 125 and 130 can be rotated relative to each other and relative to flange elements 105 and 110 to make changes to the alignment of axle portions 115 and 120 in both the y and z directions (see coordinates in FIG. 1). As such, flange system 100 allows for the correction of camber and toe. If two flange systems 100 are properly positioned on a single axle, corrections to thrust can be also be made. Index tabs 127, located on each shim 125 and 130 (FIGS. 3 and 4), can be used to determine the appropriate orientation of each shim for a desired manipulation of axle alignment. Indicia can also be added to the surface of each shim 125 and 130 to further assist in such determination.

The present invention allows for adjusting the relative position of shims 125 and 130, and therefore adjustment of the axle alignment, without requiring the labor intensive operation of separating the first and second axle portions 115 and 120 or removing wheels from the axle. More specifically, flange system 100 includes three positioning elements 50 that are located at 0, 90, and 270 degrees as shown in FIG. 1 and FIG. 4. The locations at 0, 90, and 270 degrees provide for removal of shims 125 and 130 from the bottom of flange system 100 while also maximizing the ability of positioning elements 50 to position flange elements 105 and 110 when accessing or replacing the shims. Each positioning element is located outside the peripheral edge 128 of shims 125 and 130. For this embodiment, each positioning element 50 includes a self-locking nut 140 attached to a bolt 150. Notably, bolt 150 is securely (but removably) fixed by threads within threaded aperture 155 located on first flange element 105. However, as to the second flange element 110, bolt 150 passes through a non-threaded aperture 160 having a chamfer 165 on both sides of the aperture 160 (FIG. 3). The chamfer 165 facilitates movement of second flange element 110 relative to first flange element 105 when adjusting shims 125 and 130 or connecting the axle portions 115 and 120.

A positioning nut 145 is also located on each bolt 150 at a position between the first and second flange elements 105 and 110 (FIG. 3). By applying a torque to the positioning element 50 through rotating positioning nut 145, a force can be created to either push apart or pull together the first and second flange elements 105 and 110. As such, by selectively manipulating each of the positioning elements 50, access to shims 125 and 130 can be obtained without having to completely separate axle portions 115 and 120. Accordingly, adjustments to toe, camber, and/or thrust (dual applications) can be readily performed without the labor intensive steps of removing a wheel and/or separating the axle into portions.

Flange system 100 can be installed in various axle configurations. For example, a single flange system 100 could be installed in the center of an axle to allow for adjustments to toe and camber of the wheels on both sides of the vehicle or trailer at the same time. Alternatively, as shown in FIG. 5, a pair of flange systems 100 could be installed on axle 200. In such case, the camber of each wheel spindle 205 could then be adjusted individually along with adjustments to toe. In addition, thrust (the resultant vector or direction the axle travels) could also be adjusted where a pair of flange systems 100 are installed on a single axle. Finally, it should be appreciated that flange system 100 can also be used with drive axles as well as trailer axles. The o-ring seal 135 previously described allows for the containment of fluids such as air, oil, or grease as may be desired with different axle applications.

An exemplary method of adjusting the alignment of axle portions 115 and 120 will now be described. Using the teachings disclosed herein, one of skill in the art will understand that the order of the steps discussed herein could be modified, additional steps could be added, or some steps could be eliminated or modified. As such, the method now described is provided by way of example for illustrating exemplary aspects of the invention and is not in limitation of the invention.

Initially, the owner or operator of the vehicle (meant here to include e.g., both motorized vehicles and trailers) to be adjusted may determine both the type and amount of adjustment to be made to a given axle. For example, adjustments to change the toe, camber, and/or thrust may be desired. Using a trailer axle for purposes of discussion, the alignment of the axle when the trailer is empty versus the desired alignment when the trailer is loaded to near maximum weight capacity may be considered. Consideration may also be given to whether the trailer is frequently used with loads of substantially different weights. By considering these and other factors, a determination is made as to the type and amount of adjustment to be provided.

To relieve some of the loading on the axle, the vehicle containing one or more flange systems 100 may then be raised or jacked. Ideally, the vehicle is supported on the frame or some other portion capable of bearing the vehicle weight other than the axle so as to minimize the loading on the axle. As previously stated, typically removal of the tire or wheel will not be required as the present invention allows access to shims 125 and 130 without requiring complete separation of the axle. The present description assumes that if the vehicle is supported by the frame, the weight of the wheel attached to the axle will cause the flange elements 105 and 110 to pinch shims 125 and 130 at the bottom of the shim (as used herein, top and bottom will be understood to refer to the top and bottom of the flange system 100 as shown in FIG. 2, for example) while removing pressure on the shims 125 and 130 at the top. However, the present description is exemplary only and the invention allows for controlling the separation of axle portions 115 and 120 to access the shim 125 and 130 under a variety of circumstances that may load the axle in different ways.

Referring again to FIGS. 1 through 3, once the vehicle having flange system 100 is properly supported, all fastening elements 75 are disengaged by loosening nuts 170 and removing bolts 175 from the first and second flange elements 105 and 110. Nuts 140 on the positioning elements 50 are loosened but not removed. If the axle is loaded as stated in the preceding paragraphs, then the flange elements 105 and 110 will tend towards separating at the top while pinching shims 125 and 130 at the bottom. In order to push apart the two portions 115 and 120 of the axle and gain access to the pair of non-parallel shims 125 and 130, a torque can then be applied to positioning elements 50 located at 270° and 90°. More specifically, by rotating the positioning nuts 145 of the positioning elements 50 that are located at 270° and 90°, the nuts 145 can be moved against first flange element 105 to force apart the first and second flange elements 105 and 110 in a controlled manner. Because each bolt 150 is secured in threaded aperture 155, the movement of nut 145 against first flange element 105 will push apart the first and second flange elements 105 and 110 when fastening elements 75 are removed. As this forced separation occurs, if needed, nuts 140 on the positioning elements 50 can be further loosened (either collectively or only at the positions of 270° and 90°) to allow for additional separation. If the pinch at the bottom is severe, tightening positioning element 50 at the 0° may be required to remove some of the compressive force and restore parallelism between flange element 105 and 110 and allow access to the shims.

Accordingly, the location of the three positioning elements 50 about the flange elements 105 and 110 allows for precise movements so that the separation of the axle portions 115 and 120 can be selectively controlled. As illustrated in FIG. 3, the length of bolts 150 allows the flange elements 105 and 110 to be pushed apart by a distance sufficient to allow access to seal 135, shim 125, and shim 130 without actually removing bolts 150 and thereby completely separating axle portions 115 and 120. More specifically, during the separation of flange elements 105 and 110, bolts 150 will remain in non-threaded apertures 160 so that disconnecting and completely separating axle portions 115 and 120 is unnecessary. As previously stated, flange system 100 thereby allows one to avoid the labor and time associated with removal of the wheel and axle and then subsequent efforts to realign and attach the same.

After the first and second flange elements 105 and 110 have been separated, the relative position of the pair of shims 125 and 130 can selected so as to provide the desired axle alignment. This step may be performed by removing the shims 125 and 130 from between flange elements 105 and 110 (through the bottom as shown e.g., in FIG. 3) or the shims may simply be rotated in place about their respective boss 106. As previously stated, index tabs 127 and/or indicia (not shown) placed on the shims 125 and 130 may also assist with selecting and setting the desired position of the shims. Of course, inspection and replacement of o-ring 135 can also be accomplished as well.

Once the desired position for each shim 125 and 130 relative to the axle portions 115 and 120 has been achieved, a torque can then be applied to positioning elements 50 to pull the axle portions 115 and 120 back together. More specifically, after positioning all nuts 145 back towards the first flange element 105, a torque can be applied to nut 140 of each positioning element 50 to pull the axle portions 115 and 120 back into position. Alternatively, or in conjunction with positioning elements 50, fastening elements 75 can be used to pull the axle portions 115 and 120 back into position and reconnect flange elements 105 and 110. Again, if needed, the location of the positioning elements 50 about the first and second flange elements 105 and 110 allows for careful control of the pulling movement so that alignment problems (e.g., pulling too much on one side) can be avoided. For example, by tightening each nut 140 incrementally while moving about positioning elements 50, the axle portions 115 and 120 can be pulled back together without binding.

Once the first and second flange elements 105 and 110 are pulled back together, fastening elements 75 can be re-engaged by inserting bolts 175 through the non-threaded apertures 180 in lips 25. Nuts 170 can then be tightened to secure the two axle portions 115 and 120 together. With the proper adjustment of the pair of shims 120 and 130, the axle can now have the desired camber and or toe. Again, where dual flange systems 100 are present on a single axle, adjustments to thrust may also be completed.

As stated above, if the axle is loaded such that shims 125 and 130 are pinched at the top rather than the bottom of flange system 100, positioning elements 50 still provide for a controlled method of separating flange elements 105 and 110 without e.g., removal of the wheel or complete separation of the axle portions 115 and 120. For this situation, nut 145 of the positioning element 50 located at 0° may be used to push apart the flange elements in a procedure otherwise similar to that previously described. In either case, whether the axle is pinching at the top or bottom of flange system 100, positioning elements 50 allow for the application of a torque between flange elements 105 and 110 that can be used to push or pull those elements together.

It should be understood that the present invention includes various other modifications that can be made to the exemplary embodiments described herein that come within the scope of the appended claims and their equivalents. These and other embodiments of the present invention are with the spirit and scope of the claims that now follow.

What is claimed is:

1. A method for adjusting axle alignment, the axle including two portions connected by a plurality of positioning elements and a plurality of fastening elements, comprising the steps of:

removing the plurality of fastening elements;

applying a torque to one or more positioning elements so as to cause the positioning elements to push apart the two portions of the axle;

selecting a position of a pair of non-parallel shims relative to the two portions of the axle so as to provide the desired axle alignment, wherein each shim defines a plurality of apertures positioned circumferentially about the shim, said selecting step comprising removing the pair of non-parallel shims from between the two portions of the axle while leaving the two portions of the axle connected by the positioning elements;

inserting the plurality of fastening elements through the axle portions and through the plurality of apertures defined by the shims; and, applying a torque to at least one of the positioning elements or at least one of the fastening elements, or both, to pull together the two portions of the axle.

2. A method for adjusting axle alignment as in claim 1, wherein the two portions of the axle define a plurality of apertures, and wherein said step of inserting further comprises inserting the plurality of fastening elements through the plurality of apertures of the two portions of the axle.

3. A method for adjusting axle alignment as in claim 1, further comprising the step of providing a recess in one of the axle portions and inserting an O-ring into the recess.

4. A method for adjusting axle alignment as in claim 1, wherein said selecting step comprises rotating at least one of the non-parallel shims.

5. A method for adjusting axle alignment as in claim 1, further comprising the step of determining the amount of camber based on the anticipated load and use that will be applied to the axle.

6. A method of adjusting axle alignment as in claim 1, wherein said step of applying a torque to at least one positioning element so as to push apart the two portions of the axle comprises applying the torque at a location that is between the two portions of the axle.

7. A method of adjusting axle alignment as in claim 1, wherein said step of inserting maintains the position of the pair of nonparallel shims relative to the two portions of the axle.

8. A method of adjusting axle alignment as in claim 1, wherein the pair of non-parallel shims are provided with index tabs for determining the position of each shim.

9. A system for adjusting the alignment of an axle, the axle having at least two portions, the system comprising:

a first flange and a second flange, each said flange connected with one of the axle portions;

a pair of non-parallel shims located between said first flange and said second flange, said shims each having a peripheral edge, said shims each defining a plurality of apertures;

a plurality of fastening elements connecting said first and second flanges, said fastening elements extending through said first and second flanges and through each of the plurality of apertures defined by said shims; and a plurality of positioning elements positioned outside the peripheral edges of said shims and connecting said first and second flanges, said plurality of positioning elements configured for pushing apart the two portions of the axle by application of a torque to said positioning elements, wherein said plurality of positioning elements are positioned about said first and second flanges so that said pair of non-parallel shims may be removed through the bottom of said first and second flanges without removing said plurality of positioning elements from said first and second flanges.

10. A system for adjusting the alignment of an axle as in claim 9, wherein said fastening elements also extend through a plurality of apertures defined by said first and second flanges.

11. A system for adjusting the alignment of an axle as in claim 9, the axle defining a radial direction, and wherein said plurality of positioning elements are located radially outside of said plurality of fastening elements.

12. A system for adjusting the alignment of an axle as in claim 9, wherein each of said first and second flanges defines a boss for receipt of at least one of said nonparallel shims.

13. A system for adjusting the alignment of an axle as in claim 9, wherein said first flange has a plurality of threaded holes configured for receipt of said plurality of positioning elements.

14. A system for adjusting the alignment of an axle as in claim 9, wherein said second flange has a plurality of non-threaded holes configured for receipt of said plurality of positioning elements with each said non-threaded hole having a chamfer.

15. A system for adjusting the alignment of an axle as in claim 9, wherein said plurality of positioning elements comprises three positioning elements.

16. A system for adjusting the alignment of an axle as in claim 9, wherein each positioning element comprises:
   a bolt inserted through said first and second flanges,
   a positioning nut located between said first and second flanges; and
   a nut located on said bolt at a position outside of said first and second flanges.

17. A system for adjusting the alignment of an axle as in claim 9, where said first and second flanges are each formed as an integral part of the axle portions.

18. A system for adjusting the alignment of an axle as in claim 9, wherein said pair of non-parallel shims further comprise index tabs for determining the position of said shims.

* * * * *